(12) United States Patent
Hosokawa et al.

(10) Patent No.: US 10,821,811 B2
(45) Date of Patent: Nov. 3, 2020

(54) REFRIGERANT CONTAINER

(71) Applicant: Fujikoki Corporation, Tokyo (JP)

(72) Inventors: Kouji Hosokawa, Tokyo (JP); Takeharu Ozawa, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 68 days.

(21) Appl. No.: 16/314,183

(22) PCT Filed: Oct. 17, 2017

(86) PCT No.: PCT/JP2017/037449
§ 371 (c)(1),
(2) Date: Dec. 28, 2018

(87) PCT Pub. No.: WO2018/123216
PCT Pub. Date: Jul. 5, 2018

(65) Prior Publication Data
US 2019/0160918 A1    May 30, 2019

(30) Foreign Application Priority Data
Dec. 27, 2016  (JP) ................................. 2016-252843

(51) Int. Cl.
*B60H 1/32*    (2006.01)
*F25B 43/00*   (2006.01)
(Continued)

(52) U.S. Cl.
CPC ............. *B60H 1/3226* (2013.01); *B60H 1/32* (2013.01); *B60H 1/3229* (2013.01); *F25B 43/00* (2013.01); *F25B 43/043* (2013.01); *F25B 39/04* (2013.01)

(58) Field of Classification Search
CPC ........ F25B 43/00; F25B 43/043; F25B 39/04; F25B 2400/23; F25B 43/006; B60H 1/3229
(Continued)

(56) References Cited

U.S. PATENT DOCUMENTS 5,692,394 A  * 12/1997  Ozaki ...................... F25B 1/10
                                                    62/509
2016/0010906 A1 * 1/2016  Kaspar ................. F25B 43/006
                                                    62/509

FOREIGN PATENT DOCUMENTS

CN      103575001 A     2/2014
EP      0841487 A2      5/1998
(Continued)

OTHER PUBLICATIONS

Japanese Patent Office, Official Action dated May 14, 2019, which was issued in connection with corresponding Japanese patent application No. 2016-252843, filed Dec. 27, 2016.(4 pages).
(Continued)

*Primary Examiner* — Steve S Tanenbaum
(74) *Attorney, Agent, or Firm* — Lucas & Mercanti, LLP

(57) ABSTRACT

Provided is a refrigerant container having a rational structure with a small number of components, the container having both the functions of a receiver and an accumulator. Specifically, the refrigerant container includes a tank 10 capable of temporarily storing a refrigerant; and a gas/liquid inlet port 15, a liquid-phase outlet port 16, and a gas-phase outlet port 17 that are provided in a lower portion of the tank 10. The refrigerant container 1 is adapted to separate a refrigerant introduced through the gas/liquid inlet port 15 into a liquid-phase refrigerant and a gas-phase refrigerant, and has the function of a receiver that guides only the liquid-phase refrigerant after the separation to the side of an expansion valve via the liquid-phase outlet port 16, and the function of
(Continued)

an accumulator that guides the gas-phase refrigerant after the separation to the suction side of a compressor via the gas-phase outlet port 17 together with oil contained in the liquid-phase refrigerant.

5 Claims, 6 Drawing Sheets

(51) Int. Cl.
*F25B 43/04* (2006.01)
*F25B 39/04* (2006.01)

(58) Field of Classification Search
USPC .......................................................... 62/509
See application file for complete search history.

(56) References Cited

FOREIGN PATENT DOCUMENTS

| EP | 1586834 | A1 | 10/2005 | |
|----|---------|----|---------|---|
| EP | 1860390 | A2 | 11/2007 | |
| EP | 2674699 | A1 | 12/2013 | |
| EP | 3534092 | A1 | 9/2019 | |
| JP | 2-169970 | A | 6/1990 | |
| JP | H04-061262 | A | 5/1992 | |
| JP | H07-146035 | A | 6/1995 | |
| JP | H08-5203 | A | 1/1996 | |
| JP | H09-068371 | A | 3/1997 | |
| JP | H10-170107 | A | 6/1998 | |
| JP | 2004-211921 | A | 7/2004 | |
| JP | 2012-093051 | A | 5/2012 | |
| JP | 2012-136147 | A | 7/2012 | |
| JP | 2013-184596 | A | 9/2013 | |
| JP | 2014-095491 | A | 5/2014 | |
| JP | 2014-105907 | A | 6/2014 | |
| JP | 2016-114308 | A | 6/2016 | |
| JP | 2016114308 | A | * 6/2016 | |
| WO | 2013/076971 | A1 | 5/2013 | |
| WO | WO-2013076971 | A1 * | 5/2013 | ............. F25B 43/00 |
| WO | 2013/190769 | A1 | 12/2013 | |

OTHER PUBLICATIONS

European Patent Office, Extended European Search Report and Search Opinion, dated Mar. 11, 2020, which was issued in connection with related European patent application No. 17885677.9 (8 pages).

* cited by examiner

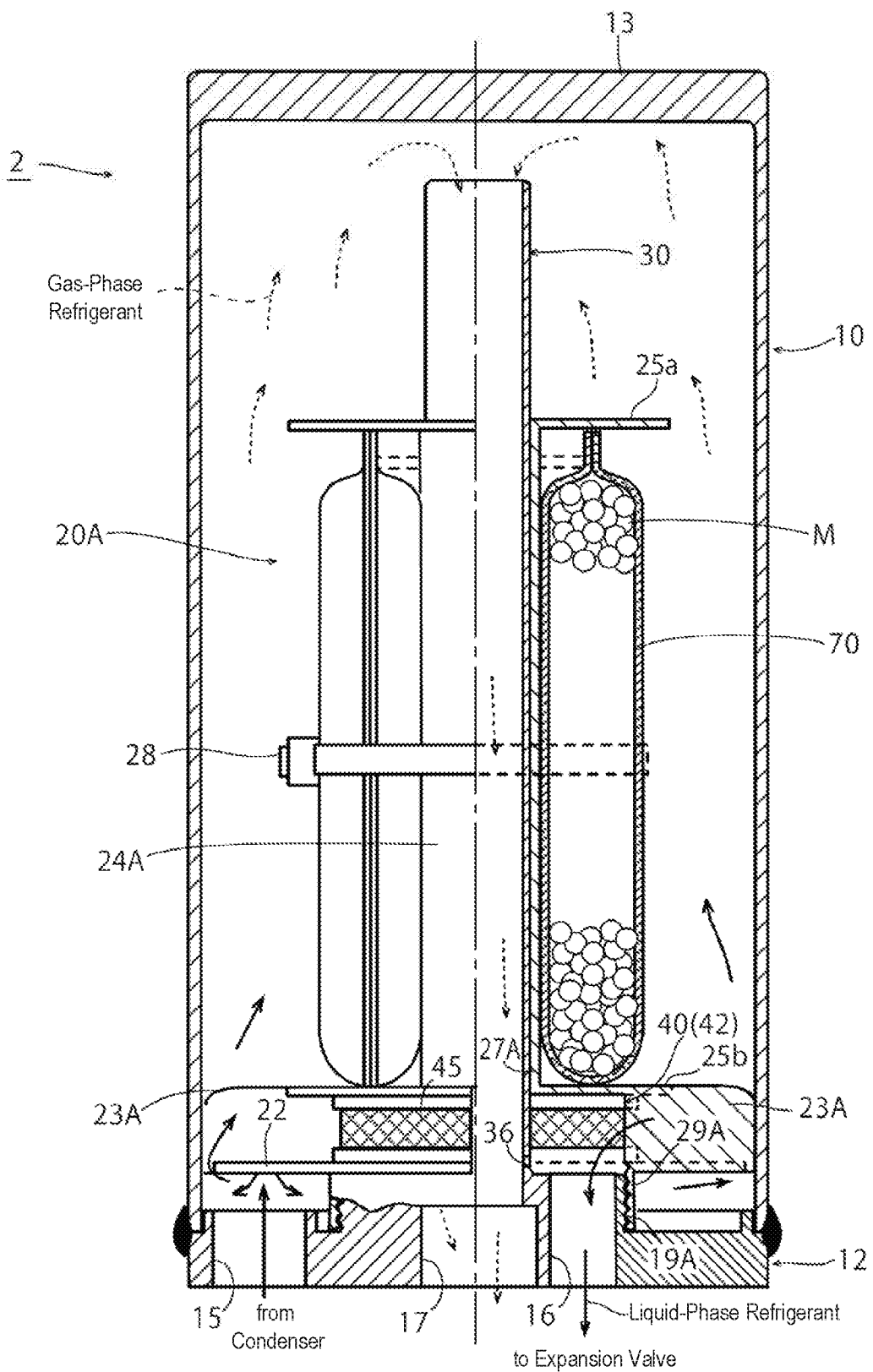

REFRIGERANT CONTAINER

CROSS-REFERENCE TO RELATED APPLICATIONS

This application is a 371 of PCT/JP2017/037449, filed Oct. 17, 2017, which claims benefit of Japanese Patent Application No. 2016-252843 filed on Dec. 27, 2016.

TECHNICAL FIELD

The present invention relates to refrigerant containers for use in the heat pump refrigeration cycles of car air-conditioners and the like (hereinafter referred to as heat pump systems). In particular, the invention relates to a refrigerant container that is adapted to separate a refrigerant into a liquid-phase refrigerant and a gas-phase refrigerant and has both the function of a receiver that guides only the liquid-phase refrigerant after the separation to the side of an expansion valve, and the function of an accumulator that guides the gas-phase refrigerant (plus oil) after the separation to the suction side of a compressor.

BACKGROUND ART

As a heat pump system forming a car air-conditioner or the like, as described in Patent Literature 1, for example, there is known a system that includes, in addition to a compressor, a condenser, an evaporator, an expansion valve, a flow channel switching valve, an on-off valve, and the like, a receiver adapted to perform gas-liquid separation for guiding only a liquid-phase refrigerant after the separation to the expansion valve, and an accumulator adapted to perform gas-liquid separation for guiding a gas-phase refrigerant (including oil) after the separation to the suction side of the compressor.

In such a heat pump system with a receiver and an accumulator, a reduction in the space occupied by the entire system as well as a reduction in the number of components is demanded.

CITATION LIST

Patent Literature

[Patent Literature 1] JP 2013-184596 A
[Patent Literature 2] JP 2012-136147 A

SUMMARY OF INVENTION

Technical Problem

As a measure to meet the aforementioned demand, it is considered to be effective to, as described in Patent Literature 2 (or FIG. 16 thereof), for example, allow a single tank (i.e., a container) to separate a refrigerant therein into a liquid-phase refrigerant and a gas-phase refrigerant, and to have the function of a receiver that guides only the liquid-phase refrigerant after the separation to the side of an expansion valve, and the function of an accumulator that guides the gas-phase refrigerant after the separation to a suction side of a compressor.

However, Patent Literature 2 only describes that a single container functions as a receiver and an accumulator, and does not at all disclose the internal structure of the container or the like.

The present invention has been made in view of the foregoing, and it is an object of the present invention to provide a refrigerant container having a rational structure with a small number of components, the container having both the functions of a receiver and an accumulator.

Solution to Problem

In order to solve the aforementioned object, a refrigerant container in accordance with the present invention basically includes a tank capable of temporarily storing a refrigerant; and a gas/liquid inlet port, a liquid-phase outlet port, and a gas-phase outlet port that are provided in a lower portion of the tank. The refrigerant container is adapted to separate a refrigerant introduced through the gas/liquid inlet port into a liquid-phase refrigerant and a gas-phase refrigerant, and has the function of a receiver that guides only the liquid-phase refrigerant after the separation to the side of an expansion valve via the liquid-phase outlet port, and the function of an accumulator that guides the gas-phase refrigerant after the separation to a suction side of a compressor via the gas-phase outlet port together with oil contained in the liquid-phase refrigerant.

In a preferred aspect, the lower-face opening of the tank is hermetically closed by a bottom cap member that includes the gas/liquid inlet port, the liquid-phase outlet port, and the gas-phase outlet port therein; a gas-liquid separation accelerating plate with a smaller diameter than an inside diameter of the tank is arranged above the bottom cap member in the tank so that a refrigerant flowing through the gas/liquid inlet port collides with the gas-liquid separation accelerating plate; the gas-phase outlet port is provided with a gas-phase outlet pipe that is adapted to guide the gas-phase refrigerant to the gas-phase outlet port from an upper portion of the tank; and a strainer is provided at the lower end of the gas-phase outlet pipe.

In a further preferred aspect, the gas-phase outlet pipe is integrally formed with the gas-phase outlet port.

In still another preferred aspect, the gas-phase outlet port is provided in a center of the bottom cap member.

In a yet another preferred aspect, the gas-liquid separation accelerating plate and the strainer are integrally formed.

In a further preferred aspect, a bag holding portion adapted to hold a bag containing a desiccant therein is integrally formed with the gas-liquid separation accelerating plate and the strainer.

In a still another preferred aspect, the refrigerant container further includes an on-off valve adapted to open or close the gas-phase outlet port.

In a further preferred aspect, the on-off valve is an electromagnetic valve.

Advantageous Effects of Invention

The refrigerant container in accordance with the present invention has both the functions of a receiver and an accumulator, and the receiver and the accumulator can share the tank portion, the inlet port portion, the gas-liquid separation portion, the strainer portion, and the like in common. Therefore, a rational structure with a small number of components can be provided, and thus, in a heat pump system that adopts such a refrigerant container, a reduction in the space occupied by the entire system as well as a reduction in the number of components is achieved, so that a reduction in the cost and size can be effectively achieved.

In addition, since the refrigerant container is provided with an on-off valve so as to be able to switch between a state in which the container functions as a receiver and a state in which the container functions as an accumulator in accordance with the operating state of the system based on opening/closing (i.e., ON or OFF) of the on-off valve, the pipe lines and the like of the system can be simplified in comparison with when the on-off valve is provided outside of the container.

Further, in the refrigerant container in accordance with the present invention, a refrigerant in a gas-liquid mixed state is introduced upward into the tank, and is allowed to collide with the gas-liquid separation accelerating plate and diffuse radially, and the refrigerant that has collided and diffused is allowed to pass through a space between the inner peripheral surface of the tank and the outer peripheral surface of the gas-liquid separation accelerating plate so that a liquid-phase refrigerant is stirred and a gas-phase refrigerant rises within the liquid, whereby the liquid-phase refrigerant is further stirred. Therefore, a bumping phenomenon in which the liquid-phase refrigerant boils explosively at once as well as generation of the accompanying impulsive sound can be effectively suppressed.

BRIEF DESCRIPTION OF DRAWINGS

FIG. 3 is a partially cutaway half longitudinal cross-sectional view illustrating a second embodiment of a refrigerant container in accordance with the present invention.

DESCRIPTION OF EMBODIMENTS

Hereinafter, embodiments of the present invention will be described with reference to the accompanying drawings.

First Embodiment

Figure 1:
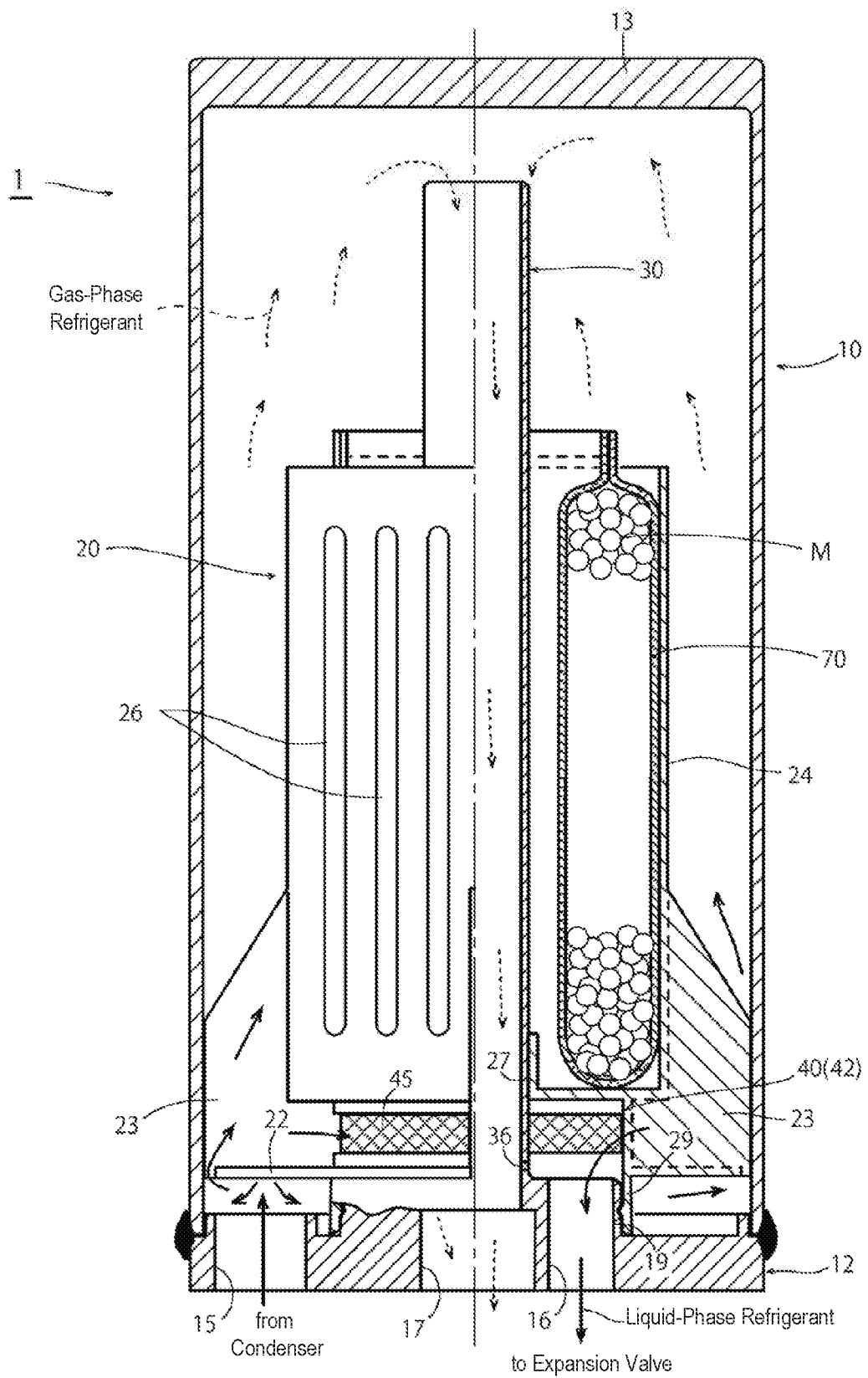
FIG. 1 is a partially cutaway half longitudinal cross-sectional view illustrating a first embodiment of a refrigerant container in accordance with the present invention.

FIG. 1 is a partially cutaway half longitudinal cross-sectional view illustrating a first embodiment of a refrigerant container in accordance with the present invention.

A refrigerant container 1 of an embodiment illustrated in FIG. 1 is used for a heat pump system forming a car air-conditioner for an electric vehicle, for example. The refrigerant container 1 includes a cylindrical tank 10 having an upper face and an open lower face and made of metal, such as stainless steel or aluminum alloy. The lower-face opening of the tank 10 is hermetically closed by a bottom cap member 12 made of the same metal. It should be noted that the refrigerant container 1 of this embodiment is placed in a vertical position as illustrated in FIG. 1, for example. That is, the refrigerant container 1 is placed with the bottom cap member 12 located on the lower side and the upper face 13 of the tank 10 located on the upper side.

The bottom cap member 12 includes a gas/liquid inlet port 15 on the left end side, a gas-phase outlet port 17 with a large diameter in the center, and a liquid-phase outlet port 16 with a relatively small diameter on the right end side, which are arranged side by side in the bottom cap member 12 while penetrating through the bottom cap member 12 such that they are open on the top and bottom sides thereof. It should be noted that in the refrigerant container 1 of this embodiment, the gas/liquid inlet port 15 is connected to a condenser, the liquid-phase outlet port 16 is connected to an expansion valve, and the gas-phase outlet port 17 is connected to a suction side of a compressor.

The gas-phase outlet port 17 is integrally formed with a gas-phase outlet pipe 30 made of a straight pipe (i.e., a linear pipe lying along the center line) for guiding a gas-phase refrigerant from the upper portion of the tank 10 to the gas-phase outlet port 17.

An internal-fit coupling portion 19 with a short cylindrical shape, which has an annular recess portion for coupling an internal unit 20 described below to the bottom cap member 12 in a snap-fit arrangement, is provided in a protruding manner in the center portion of the upper face side of the bottom cap member 12 (i.e., a portion including the gas-phase outlet port 17 in the center and the liquid-phase outlet port 16 on the right end side).

Figure 2A:
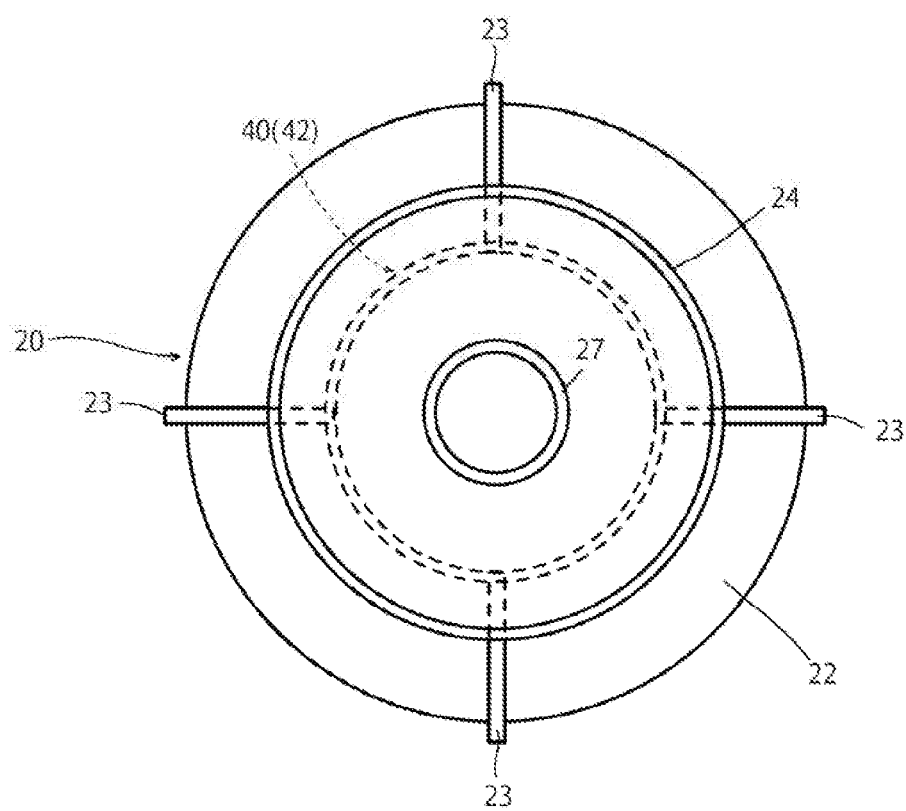
FIG. 2A is a plan view illustrating an internal unit of the refrigerant container of the first embodiment.
Figure 2B:
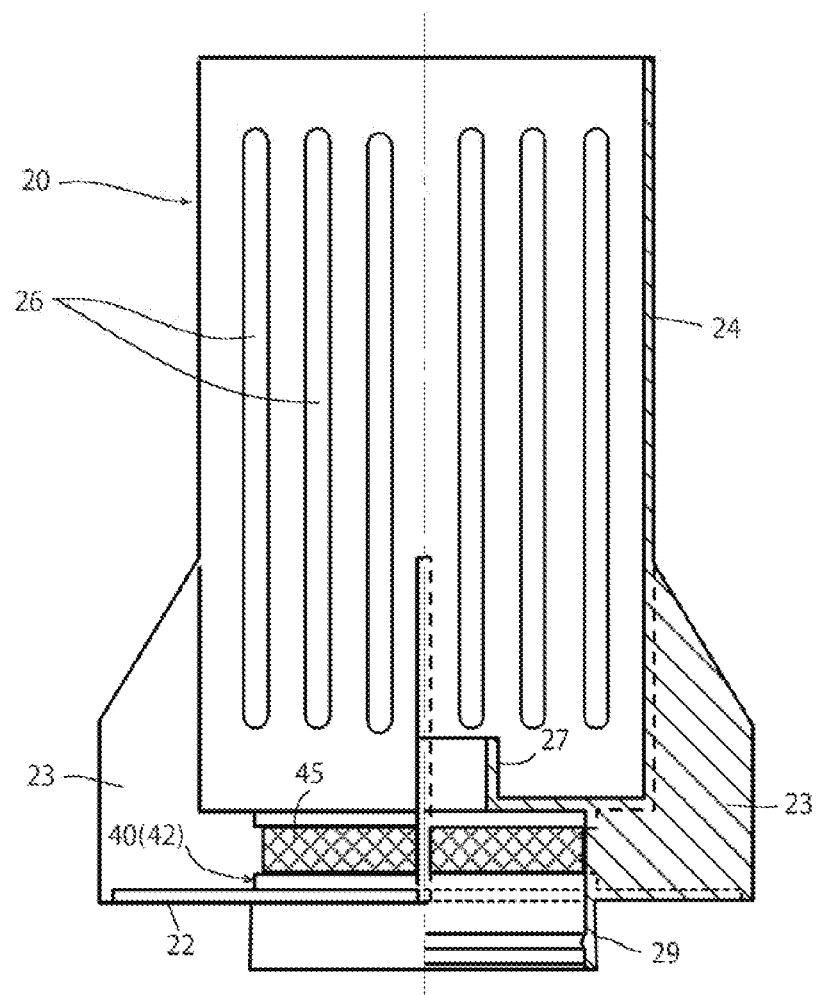
FIG. 2B is a half longitudinal cross-sectional view illustrating an internal unit of the refrigerant container of the first embodiment.

In addition, the internal unit 20 is arranged in the tank 10. The internal unit 20 is made of synthetic resin, for example, and has at the bottom thereof a gas-liquid separation accelerating plate 22 with an annular disk shape, as is clearly seen in FIGS. 2A and 2B as well as FIG. 1. The gas-liquid separation accelerating plate 22 has the shape of an annular disk with an outside diameter slightly smaller than the inside diameter of the tank 10, and an inside diameter substantially equal to the inside diameter of a strainer 40 described below, and the lower face of the gas-liquid separation accelerating plate 22 is arranged above the upper face of the bottom cap member 12 (or the gas/liquid inlet port 15 therein) by a predetermined distance so as to be opposite the gas/liquid inlet port 15 so that a refrigerant that has flowed into the tank 10 through the gas/liquid inlet port 15 can collide with the gas-liquid separation accelerating plate 22 and diffuse radially, and then, the refrigerant that has collided and diffused can flow to the upper side through a space between the inner peripheral surface of the tank 10 and the outer peripheral surface of the gas-liquid separation accelerating plate 22.

In the center of the lower face side of the gas-liquid separation accelerating plate 22, an external-fit coupling portion 29 with a short cylindrical shape, which has formed thereon an annular protrusion adapted to be fitted in the annular recess portion of the internal-fit coupling portion 19 provided in the bottom cap member 12, is provided such that it protrudes downward. Accordingly, the bottom cap member 12 and the internal unit 20 can be coupled together in a snap-fit arrangement, which makes assembly easy.

The strainer 40 is provided in the center of the upper face side of the gas-liquid separation accelerating plate 22, and four reinforcing upright plate portions 23 are disposed in upright position on the outer periphery of the upper face side of the strainer 40 at equal angular intervals (that is, at intervals of 90°), and the outer peripheries of the reinforcing upright plate portions 23 are allowed to abut the inner periphery of the tank 10.

A cylindrical bag holding portion 24 having a bottom, which has pressed and held therein the substantially entire bag 70 that is cylindrical in shape or is wound in a C-shape in plan view and containing desiccants M therein, is integrally formed with the inner peripheries of the reinforcing upright plate portions 23 above the strainer 40. The bag holding portion 24 has a plurality of elongated holes 26 formed therein for passing a refrigerant therethrough in the thickness direction. It should be noted that the bag 70 housed in the bag holding portion 24 is made of a fabric such as felt with a ventilation property, a water permeation property, and a desired shape retention property, and is filled with granular desiccants M almost entirely. The bag 70 has a predetermined height. Further, a central cylindrical portion 27 having a short cylindrical shape with a small diameter, in which the gas-phase outlet pipe 30 is adapted to be fitted (press-fitted), is provided on the inner periphery side of the bag holding portion 24, and the gas-phase outlet pipe 30 is inserted into a region on the inner side of the bag 70 housed in the bag holding portion 24, with a small clearance therebetween. Needless to say, it is also possible to press-fit the gas-phase outlet pipe 30 into the central cylindrical portion 27 first, and thereafter insert the bag 70 into the bag holding portion 24 along the inner wall thereof.

Meanwhile, the strainer 40 is integrally formed with and on the gas-liquid separation accelerating plate 22, and includes a cylindrical mesh filter 45 and a case portion 42 to which the mesh filter 45 is fixed. The mesh filter 45 is made of a metallic mesh or a mesh material of synthetic resin, for example. The case portion 42 includes upper and lower annular disk portions, and inner peripheral ends (i.e., four portions) of the reinforcing upright plate portions 23 located between them. That is, four windows that are rectangular in side view are defined between the four columnar portions (i.e., the inner peripheral ends), and the mesh filter 45 is put in the portion of each window in a tensed manner. It should be noted that the mesh filter 45 may be integrally formed with the case portion 42 (i.e., the internal unit 20) through insert molding during molding of the case portion 42.

An oil return hole 36 is provided around the lower end of the gas-phase outlet pipe 30 integrally formed with the bottom cap member 12, that is, at a portion above the liquid-phase outlet port 16 and on the inner side of the mesh filter 45. The diameter of the oil return hole 36 is set to about 1 mm, for example.

In addition, the refrigerant container 1 of this embodiment should be allowed to function as a receiver during the cooling operation and function as an accumulator during the heating operation. Therefore, though not shown, an electromagnetic on-off valve, which is adapted to close the gas-phase outlet port 17 (or a flow channel continuous with the gas-phase outlet port 17, for guiding a gas-phase refrigerant) during the cooling operation or open it during the heating operation, is provided integrally with or separately from the container.

The operations of the refrigerant container 1 with the aforementioned structure during the cooling operation and the heating operation will be described.

In each of the cooling operation and the heating operation, a refrigerant in a gas-liquid mixed state, which has been introduced upward into the tank 10 from a condenser via the gas/liquid inlet port 15, collides with a portion around the left end of the lower face of the gas-liquid separation accelerating plate 22, and diffuses radially, and is then rectified in an upward direction while passing through a space between the inner peripheral surface of the tank 10 and the outer peripheral surface of the gas-liquid separation accelerating plate 22 so that the refrigerant is effectively separated into a liquid-phase refrigerant and a gas-phase refrigerant. In such a case, the liquid-phase refrigerant (including oil) is accumulated in the lower space of the tank 10, and the gas-phase refrigerant rises to the upper space of the tank 10.

During the cooling operation, the on-off valve is closed (i.e., power is OFF) and the gas-phase outlet port 17 is closed. Therefore, the gas-phase refrigerant is not guided to the suction side of the compressor.

In addition, during the cooling operation, the liquid-phase refrigerant accumulated in the lower space of the tank 10 is guided to the expansion valve from the liquid-phase outlet port 16 through the strainer 40 (or the mesh filter 45 thereof) due to the pressure difference between the inside of the tank 10 and the expansion valve side.

Therefore, during the cooling operation, the refrigerant container 1 of this embodiment functions as a receiver (i.e., a receiver driver).

In contrast, during the heating operation, the on-off valve is opened (i.e., power is ON) and the gas-phase outlet port 17 is opened. Therefore, the gas-phase refrigerant is directly suctioned to the suction side of the compressor via the upper space of the tank 10→the gas-phase outlet pipe 30→the gas-phase outlet port 17, and thus is circulated.

During the heating operation, the liquid-phase refrigerant accumulated in the lower space of the tank 10 hardly flows to the expansion valve due to the relationship of the pressure difference.

In addition, oil accumulated in the lower space of the tank 10 together with the liquid-phase refrigerant moves toward the bottom cap member 12 of the tank 10 due to the difference between the oil and the liquid-phase refrigerant in specific gravity, properties, and the like, and is absorbed into the gas-phase refrigerant to be suctioned to the suction side of the compressor via the gas-phase outlet pipe 30, and thus is returned to the suction side of the compressor together with the gas-phase refrigerant via the mesh filter 45 of the strainer 40→the oil return hole 36 provided around the lower end of the gas-phase outlet pipe 30. When the oil passes through the mesh filter 45, foreign matter such as sludge is trapped thereby so that the foreign matter is removed from the circulating refrigerant (including oil).

Therefore, during the heating operation, the refrigerant container 1 of this embodiment functions as an accumulator.

As described above, the refrigerant container 1 of this embodiment has both the functions of a receiver and an accumulator, and the receiver and the accumulator share the tank portion (i.e., the tank 10), the inlet port portion (i.e., the gas/liquid inlet port 15), the gas-liquid separation portion (i.e., the gas-liquid separation accelerating plate 22), and the strainer portion (i.e., strainer 40) in common. Therefore, a rational structure with a small number of components can be provided, and thus, in a heat pump system that adopts the refrigerant container 1, a reduction in the space occupied by the entire system as well as a reduction in the number of components is achieved, so that a reduction in the cost and size can be effectively achieved.

In addition, since the refrigerant container 1 is provided with the on-off valve so as to be able to switch between a state in which the container functions as a receiver and a state in which the container functions as an accumulator in accordance with the operating state of the system based on opening/closing (i.e., ON or OFF) of the on-off valve, the pipe lines and the like of the system can be simplified in comparison with when the on-off valve is provided outside of the container.

In addition, in the refrigerant container 1 of this embodiment, a refrigerant in a gas-liquid mixed state is introduced upward into the tank 10 through the gas/liquid inlet port 15 provided at the bottom of the tank 10, and is allowed to collide with the gas-liquid separation accelerating plate 22 and diffuse radially, and the refrigerant that has collided and diffused is allowed to pass through a space between the inner peripheral surface of the tank 10 and the outer peripheral surface of the gas-liquid separation accelerating plate 22 so that a liquid-phase refrigerant is stirred and a gas-phase refrigerant rises within the liquid, whereby the liquid-phase refrigerant is further stirred. In this manner, as the liquid-phase refrigerant accumulated in the tank 10 is stirred, a bumping phenomenon in which the liquid-phase refrigerant boils explosively at once as well as generation of the accompanying impulsive sound can be suppressed.

Second Embodiment

FIG. 3 is a partially cutaway half longitudinal cross-sectional view illustrating a second embodiment of a refrigerant container in accordance with the present invention.

A refrigerant container 2 of the embodiment illustrated in FIG. 3 differs from the refrigerant container 1 of the aforementioned first embodiment in the structure of the bag holding portion in the internal unit 20 and the portion where the bottom cap member 12 is coupled to the internal unit 20, and the other portions are basically the same. Therefore, in the following, only the differences will be described.

In the refrigerant container 2 of this embodiment, the center portion of the upper face side of the bottom cap member 12 is provided with an external thread portion 19A for coupling an internal unit 20A to the bottom cap member 12 through screwing, while the internal unit 20A side is provided with an internal thread portion 29A to be screwed in the external thread portion 19A. Even when such screwing is used, assembly can be simplified.

Figure 4A:
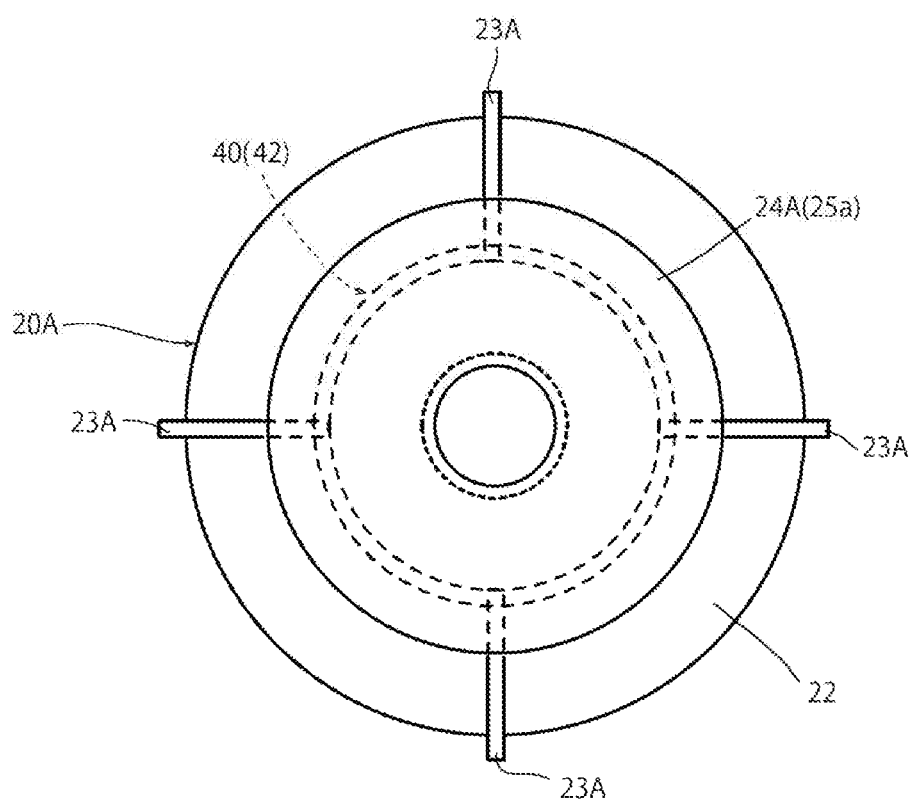
FIG. 4A is a plan view illustrating an internal unit of the refrigerant container of the second embodiment.
Figure 4B:
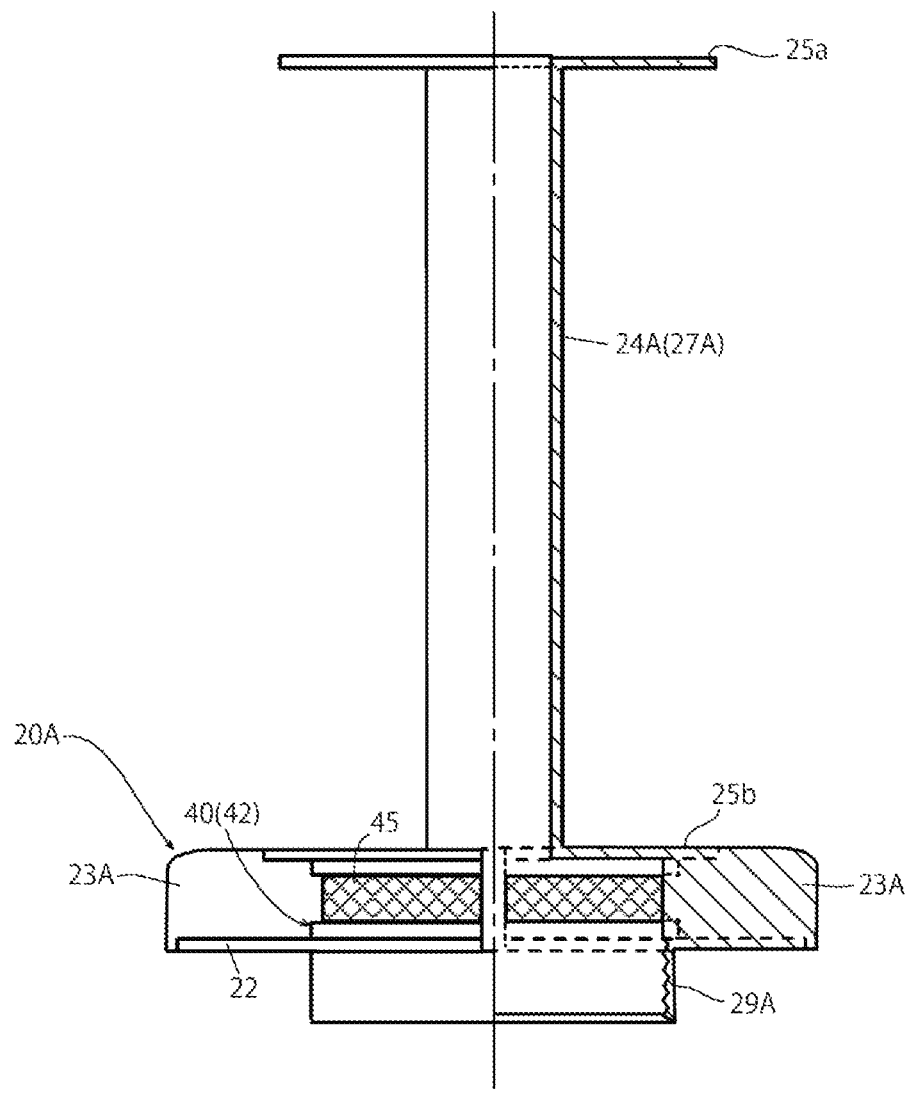
FIG. 4B is a half longitudinal cross-sectional view illustrating the internal unit of the refrigerant container of the second embodiment.

In addition, in this embodiment, as is clearly seen in FIGS. 4A and 4B in addition to FIG. 3, a bobbin-shaped bag holding portion 24A, which has a long cylindrical portion 27A with a small diameter, in which the gas-phase outlet pipe 30 is adapted to be inserted, is provided on the inner periphery side of the reinforcing upright plate portions 23A, above the strainer 40 of the internal unit 20A. The bobbin-shaped bag holding portion 24A is adapted to allow a bag 70 containing desiccants M therein to be wound on the long cylindrical portion 27A thereof and further allow a banding band 28 to be wound around the outer periphery of the bag 70 so as to securely hold the bag 70. In such a case, the bag 70 held has a cylindrical shape or a C-shape in plan view, and the upper and lower ends of the bag 70 are slightly pushed against a pair of upper and lower flange portions 25a, 26b of the bag holding portion 24A.

The other structures are basically substantially the same as those in the first embodiment, and thus, it is needless to specifically mention that operational effects that are substantially the same as those in the aforementioned first embodiment can be obtained.

It should be noted that in the aforementioned embodiments, the gas-phase outlet port 17 is adapted to be opened or closed by the on-off valve. However, additionally, an on-off valve adapted to open or close the liquid-phase outlet port 16 may also be provided so that the on-off valve is opened or closed in an inverse manner to that on the gas-phase refrigerant side. Further, the on-off valves on the gas-phase side and the liquid-phase side may be combined to form a four-way valve.

Furthermore, the refrigerant container 1 need not necessarily be provided with the aforementioned on-off valve or the four-way valve, and such valve may be provided on the outside flow channel, for example, a flow channel connecting the liquid-phase outlet port and the expansion valve, or a flow channel connecting the gas-phase outlet port and the suction side of the compressor.

REFERENCE SIGNS LIST

1 Refrigerant container (first embodiment)
2 Refrigerant container (second embodiment)
10 Tank
12 Bottom cap member
13 Upper face of tank
15 Gas/liquid inlet port
16 Liquid-phase outlet port
17 Gas-phase outlet port
20 Internal unit
22 Gas-liquid separation accelerating plate
23 Reinforcing upright plate portion
24 Bag holding portion
30 Gas-phase outlet pipe
36 Oil return hole
40 Strainer
45 Mesh filter
70 Bag
M Desiccants

The invention claimed is:

1. A refrigerant container comprising:
a tank capable of temporarily storing a refrigerant;
a gas/liquid inlet port, a liquid-phase outlet port, and a gas-phase outlet port that are provided in a lower portion of the tank,
wherein:
the refrigerant container is adapted to separate a refrigerant introduced through the gas/liquid inlet port into a liquid-phase refrigerant and a gas-phase refrigerant, and has a function of a receiver that guides only the liquid-phase refrigerant after the separation to a side of an expansion valve via the liquid-phase outlet port, and a function of an accumulator that guides the gas-phase refrigerant after the separation to a suction side of a compressor via the gas-phase outlet port together with oil contained in the liquid-phase refrigerant through the use of an on/off valve adapted to open or close the gas-phase outlet port,
the gas/liquid inlet port is provided at a position that allows the liquid-phase refrigerant accumulated around a bottom of the tank to be stirred by a refrigerant in a gas-liquid mixed state introduced through the gas/liquid inlet port,
a lower-face opening of the tank is hermetically closed by a bottom cap member that includes the gas/liquid inlet port, the liquid-phase outlet port, and the gas-phase outlet port therein,
a gas-liquid separation accelerating plate with a smaller diameter than an inside diameter of the tank is arranged above the bottom cap member in the tank so that a refrigerant flowing through the gas/liquid inlet port collides with the gas-liquid separation accelerating plate,
the gas-phase outlet port is provided with a gas-phase outlet pipe that is adapted to guide the gas-phase refrigerant to the gas-phase outlet port from an upper portion of the tank, and
a strainer is provided at a lower end of the gas-phase outlet pipe and is integrally formed with the gas-liquid separation accelerating plate.

2. The refrigerant container according to claim 1, wherein the gas-phase outlet pipe is integrally formed with the gas-phase outlet port.

3. The refrigerant container according to claim 1, wherein the gas-phase outlet port is provided in a center of the bottom cap member.

4. The refrigerant container according to claim 1, wherein a bag holding portion adapted to hold a bag containing a desiccant therein is integrally formed with the gas-liquid separation accelerating plate and the strainer.

5. The refrigerant container according to claim 1, wherein the on-off valve is an electromagnetic valve.

* * * * *